(12) United States Patent
Arulf

(10) Patent No.: US 6,494,407 B2
(45) Date of Patent: Dec. 17, 2002

(54) JOINT ON A SPACECRAFT

(75) Inventor: Örjan Arulf, Linköping (SE)

(73) Assignee: Saab Ericsson Space AB, Göteborg (SE)

(*) Notice: Subject to any disclaimer, the term of this patent is extended or adjusted under 35 U.S.C. 154(b) by 0 days.

(21) Appl. No.: 10/013,841

(22) Filed: Dec. 13, 2001

(65) Prior Publication Data

US 2002/0088903 A1 Jul. 11, 2002

(30) Foreign Application Priority Data

Dec. 14, 2000 (SE) ............................................. 0004645

(51) Int. Cl.⁷ ................................................. B64G 1/62
(52) U.S. Cl. ........................ 244/161; 244/131; 403/333
(58) Field of Search .............................. 244/161, 158 R, 244/131; 403/334, 333

(56) References Cited

U.S. PATENT DOCUMENTS

| | | | |
|---|---|---|---|
| 4,848,806 A | * | 7/1989 | Miller |
| 5,649,680 A | | 7/1997 | Andersson |
| 6,076,467 A | * | 6/2000 | Cespedosa et al. |
| 6,290,182 B1 | * | 9/2001 | Grunditz |

FOREIGN PATENT DOCUMENTS

| | | | | |
|---|---|---|---|---|
| FR | 2794102 | | 2/2000 | |
| JP | 404087900 | * | 3/1992 | ................. 244/161 |
| JP | 404252800 | * | 9/1992 | ................. 244/161 |
| JP | 405147598 | * | 6/1993 | ................. 244/161 |
| JP | 406099900 | * | 4/1994 | ................. 244/161 |
| SE | 511 762 | | 3/1999 | |

* cited by examiner

*Primary Examiner*—Tien Dinh
(74) *Attorney, Agent, or Firm*—Swidler Berlin Shereff Friedman, LLP

(57) ABSTRACT

A joint (4) on a spacecraft (1) for holding together a first craft part (2) and a second craft part, (3) detachable from the first craft part (2). The joint (4) comprises a first flange (5) fixed on the first craft part (2), and a second flange (6) fixed on the second craft part (3), and a number of clamps (7) having a first (7a) and a second (7c) clamp lip, the said clamps being distributed about the periphery of the flanges (5, 6). The clamps transfer radial forces from a tightening device (8), fitted to the clamps (7), so as to fasten the two flanges (5, 6) together. The first flange (5) is clamped between a first clamp surface (7b) on the first clamp lip (7a), and a separation surface (6b) on the second flange (6). These surfaces (7b, 6b) form an acute angle δ, the apex of which is directed in towards the spacecraft (1).

5 Claims, 1 Drawing Sheet

JOINT ON A SPACECRAFT

TECHNICAL FIELD

The invention presented here relates to a joint for holding together detachable parts of a spacecraft, particularly during launching of the spacecraft. More specifically, the invention concerns a joint comprising a number of clamps, which by means of an encircling brace are pressed against flanges on the detachable components and thereby holding them together.

BACKGROUND TO THE INVENTION AND THE PROBLEM

Joint devices for connecting, without any significant relative movement, detachable parts of a spacecraft, for example a carrier rocket and a satellite, are important structural units for absorbing the forces that arise between the said parts during launching of the spacecraft.

In the patent document SE 511 762 a flange joint on a space rocket is described. The flange joint has an axially directed guide on a first flange, and a corresponding slot in the second flange for absorbing shearing loads.

The joint devices must be low-weight and be designed for very high reliability because of the extremely high cost of launching, as well as the impossibility of correcting any faults that may arise when the craft has left the ground. Low weight is particularly important for the spacecraft's satellite part.

Spacecraft and their detachable parts are subjected to loads, for example moments of bending and torsion, vibrations and pressure. When the spacecraft is subjected to, for example, a moment of bending, it produces a tension load on one side of the spacecraft and a thrust load on the opposite side of the spacecraft. On the side where the tension load arises, forces are produced that act to press in towards the spacecraft the part of the satellite part closest to the joint.

THE PURPOSE OF THE INVENTION AND THE SOLUTION TO THE PROBLEM

The purpose of the invention is to solve one or more of the above-described problems. This is achieved with a device as in claim 1.

By equipping the joint with a clamped flange which has an acute angle directed in towards the craft, the flange is obstructed from moving outwards.

The accompanying sub-claims describe additional preferred embodiments according to the invention

DESCRIPTION OF DRAWINGS

The invention will be further described in an embodiment example, with reference to FIG. 1, which shows an outline of a schematic section of a joint with two detachable parts, as defined by the invention.

DESCRIPTION OF EMBODIMENT EXAMPLE

Figure 1:
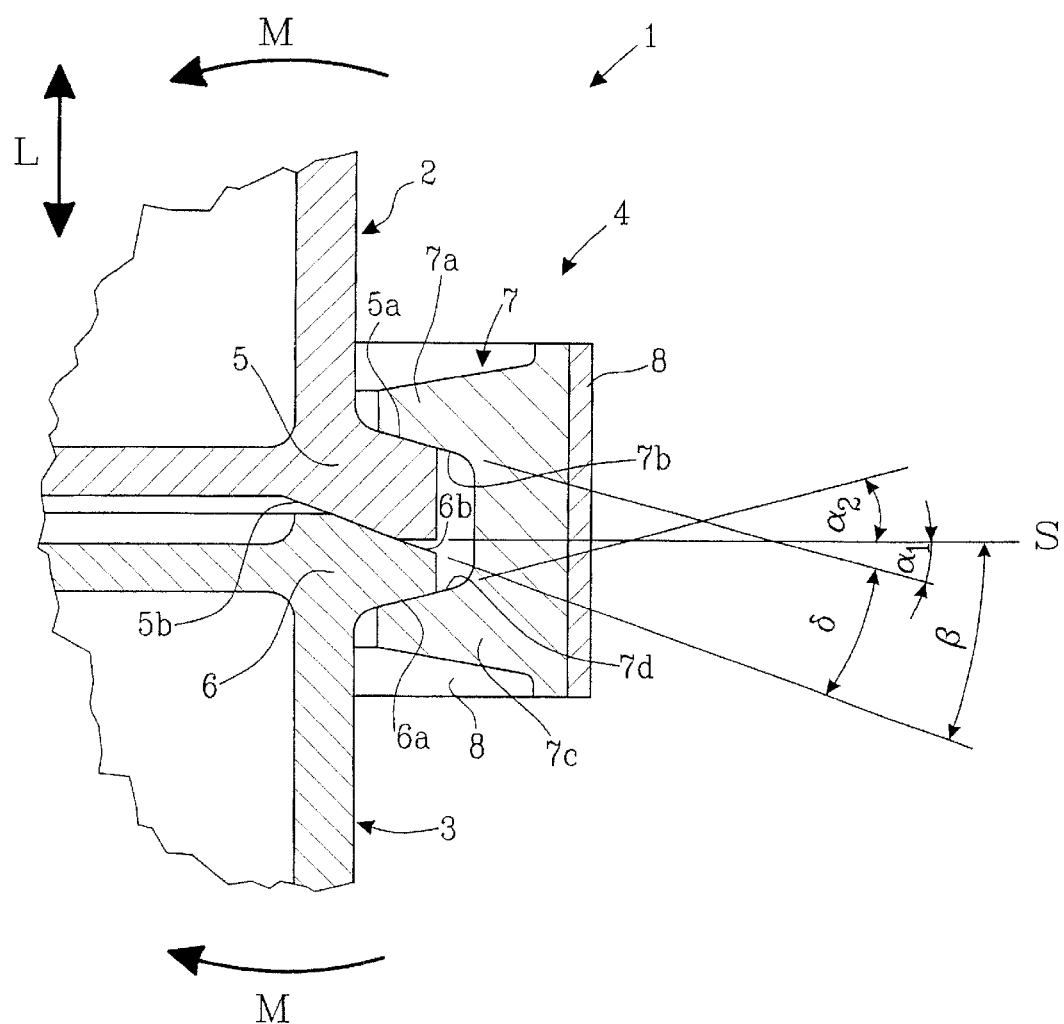

A spacecraft is indicated by 1 in the drawing. The spacecraft comprises two mutually detachable parts 2, 3, for example a satellite part 2 positioned on a carrier rocket 3, a so-called launcher part. A joint 4 is present to keep the two parts 2, 3 together during the time the joint is being used.

The joint includes a first flange 5 fixed at a lower part of the first craft part 2, and a second flange 6 fixed at an upper part of the second craft part 3. Furthermore, the joint 4 consists of one or more clamps 7 distributed around the periphery of the flanges 5, 6, and a tightening device 8, which extends around or through the clamps 7 and presses them radially inwards against the flanges 5, 6.

The clamps 8 are thus designed to transmit a radial force from the tightening device 8 to a clamping force, and to press the flanges 5, 6 against each other. To this end, the clamps 7 have a first clamp lip 7a with a first clamp surface 7b, and a second clamp lip 7c with a second clamp surface 7d. The clamp surfaces 7b, 7d each produce an angle $\alpha_1$, $\alpha_2$ with and on each side of a plane S, which cuts the spacecraft across the longitudinal direction. On the flange 5, there is a clamp surface 7b corresponding to surface 5a, and on the flange 6, there is a clamp surface 7d corresponding to surface 6a, so that the flanges 5, 6 are pressed together when the joint 4 is fitted. The angles $\alpha_1$, $\alpha_2$ are between 5° and 30°, preferably approx. 9°–20°. A small angle for $\alpha_1$, $\alpha_2$, for example 8° or less, produces a high clamping force but at the same time increases the risk for self-locking as a result of friction between the clamp surfaces 7b, 7d and respective flange surfaces 5a, 6a. Self-locking can result in the joint 4 failing to open when the tightening device 8 is released.

Thus, the first flange's surface 5a has an angle common with the clamp surface 7b, and the second flange's surface 6a has an angle common with the clamp surface 7d. The angles $\alpha_1$, $\alpha_2$ are exemplified in FIG. 1, both having a size of 15°. The first flange has a surface 5b and the second flange has a surface 6b, the said surfaces being pressed against each when assembled. These surfaces 5b, 6b are separation surfaces and define an angle $\delta$ of 10–35° with the plane S, and preferably 20°, as shown in FIG. 1. The separation surfaces thus form a part of a cone, the apex of which is accommodated in the first craft part.

The angle $\delta$ is greater than the angle $\alpha_1$, which means that when the joint 4 is fitted the first flange 5 is pressed between the first clamp surface 7b on the first clamp lip 7a and the separation surface 6b on the second flange 6. In accordance with the invention, these surfaces 7b, 6b display an acute angle $\delta$, the apex of which is directed towards the spacecraft 1. Consequently, a tightened joint 4 causes the first flange 5 to be forced outwards from the craft and, in this way, counteracts the inward acting forces from, for example, the bending moment M on the spacecraft 1.

The invention is not to be considered as limited to the examples described above, but may be varied within the scope of the claims. For example, the clamp lip surfaces can be placed asymmetrically around the plane S.

List of Reference Characters 1 spacecraft
2 first craft part
3 second craft part
4 joint
5 first flange
5a first flange's surface
5b first flange's separation surface
6 second flange
6a second flange's surface
6b second flange's separation surface
7 clamp
7a first clamp lip
7b first clamp surface
7c second clamp lip
7d second clamp surface
8 tightening device
M moment L longitudinal direction of craft
S plane through the longitudinal direction

What is claimed is:

1. A joint (4) on a spacecraft (1) for holding together a first craft part (2) and a second craft part (3), detachable from the first craft part (2), where the joint (4) comprises a first flange (5) fixed on the first craft part (2), and a second flange (6) fixed on the second craft part (3), and a number of clamps (7) having a first (7a) and a second (7c) clamp lip, the said clamps, distributed about the periphery of the flanges (5, 6), being designed to transfer radial forces from a tightening device (8), fitted to the clamps (7), so as to fasten the two flanges (5, 6) together, whereby the first flange (5) is clamped between a first clamp surface (7b) on the first clamp lip (7a), and a separation surface (6b) on the second flange (6), the said surfaces (7b, 6b) forming an acute angle $\delta$, characterised in that, the apex of the angle $\delta$ is directed in towards the spacecraft (1).

2. Joint as in claim 1, characterised in that, the separation surface (6b) on the second flange (6) forms a part of a cone, the apex of which is accommodated in the first craft part (2).

3. Joint as in claim 1, characterized in that, the first clamp lip's (7a) clamp surface (7b) forms an angle $\alpha_1$ of between 5°–30° with a plane S cutting the spacecraft across its longitudinal direction L.

4. Joint as in claim 1, characterized in that, the second clamp lip (7c) has a clamp surface (7b) that forms an angle $\alpha_2$ of 5°–30° with a plane S cutting the spacecraft across its longitudinal direction L.

5. Joint as in claim 2, characterized in that, the cone forms an angle $\delta$ of 10°–35° with a plane S cutting the spacecraft across its longitudinal direction L.

* * * * *